Jan. 5, 1971     R. SINE     3,552,760
FOLDING WHEELBARROW
Filed Aug. 22, 1968     2 Sheets-Sheet 1
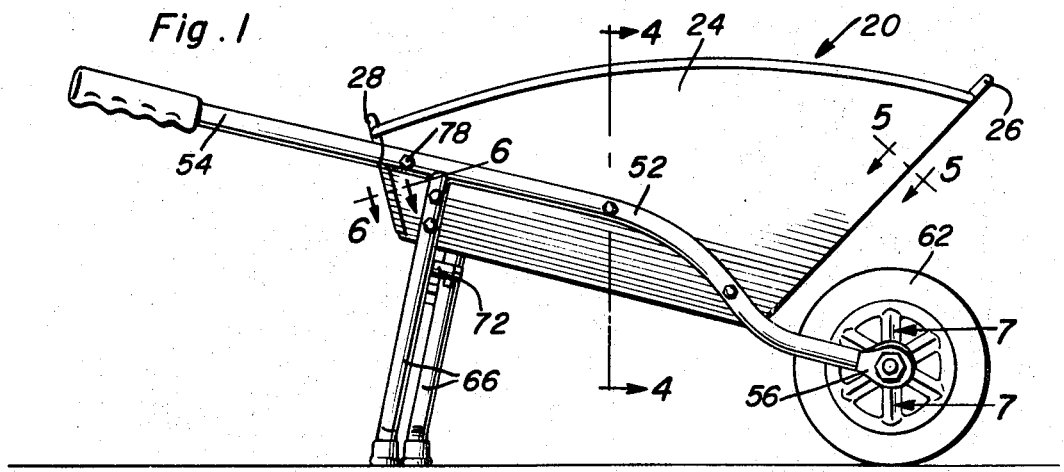
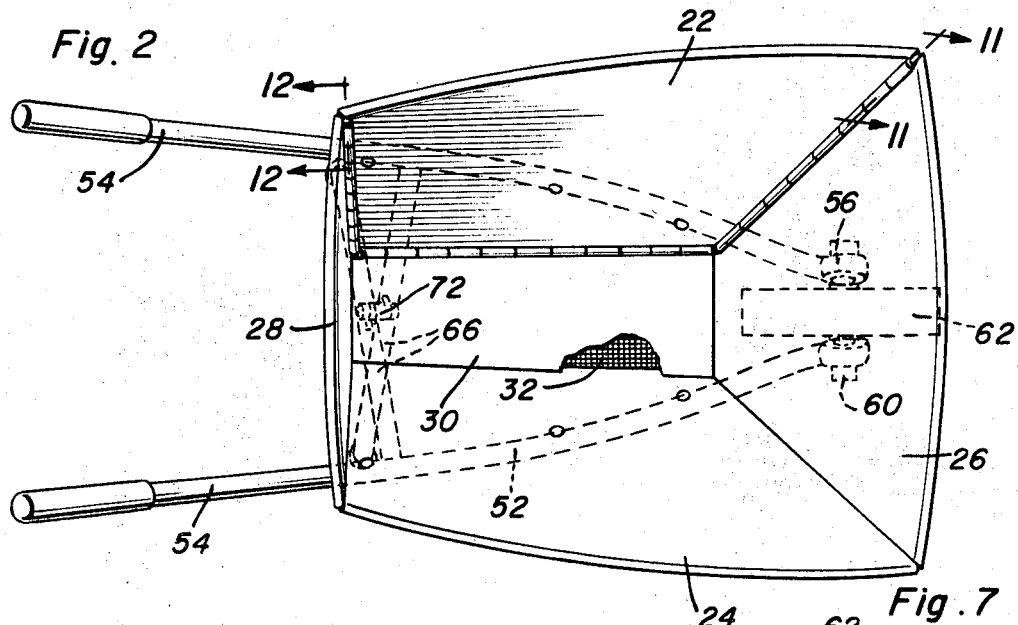
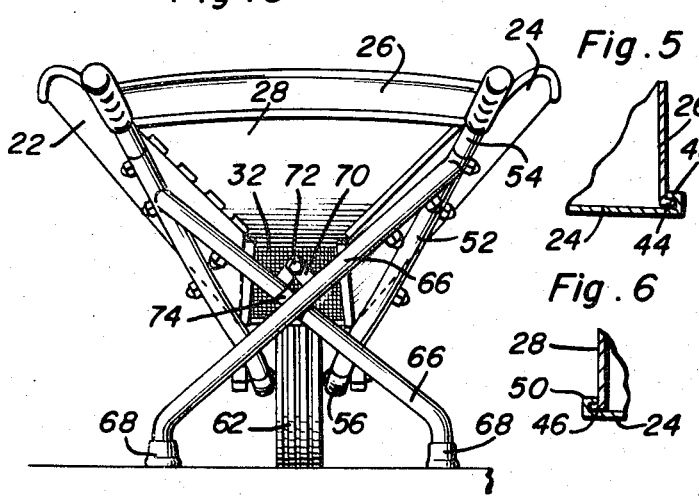
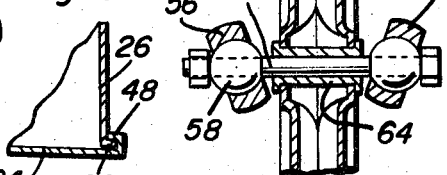
Richard Sine
INVENTOR.
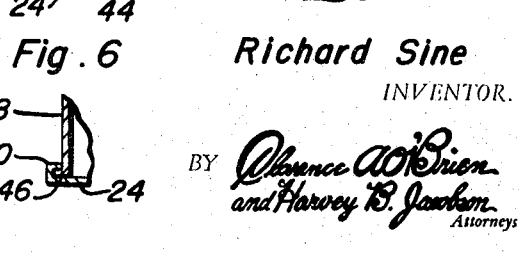

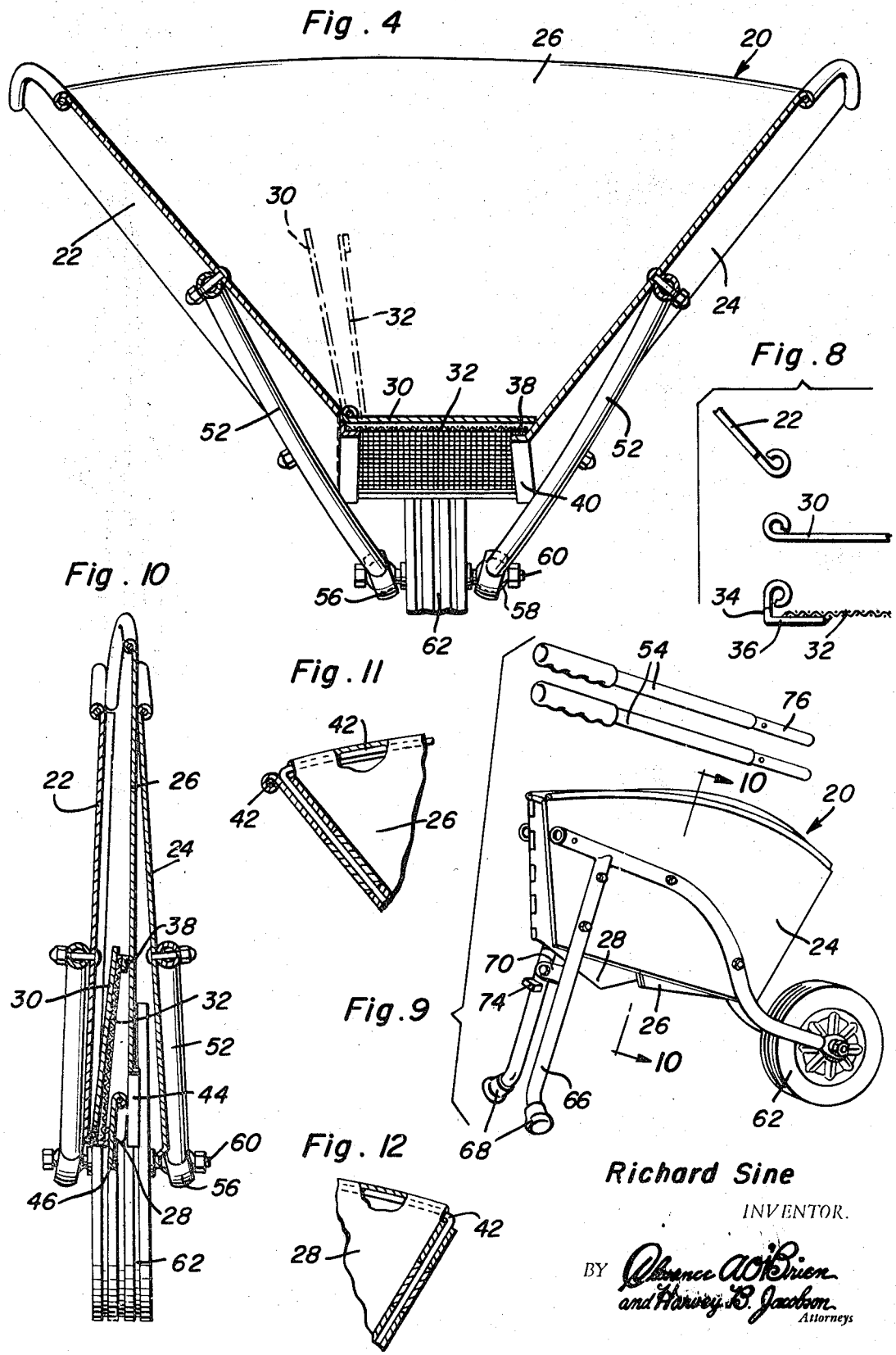

United States Patent Office 3,552,760
Patented Jan. 5, 1971

3,552,760
FOLDING WHEELBARROW
Richard Sine, 505 E. 5th St., Reno, Nev. 89501
Filed Aug. 22, 1968, Ser. No. 754,587
Int. Cl. B62b 1/20
U.S. Cl. 280—36     9 Claims

ABSTRACT OF THE DISCLOSURE

A folding wheelbarrow including, in its unfolded operative position, outwardly sloping side, front and rear panels surrounding a bottom panel in a material-confining manner. The bottom panel, as well as the front and rear panels, are hingedly mounted to one side panel and selectively foldable thereagainst, after which the second side panel is also folded against the first side panel so as to sandwich the bottom, front and rear panels therebetween. The collapsing and unfolding of the wheelbarrow is effected through the two handles therefor which are swivelly mounted on the wheel axle for swinging movement toward and away from each other, appropriate stop means limiting the opening swinging of the handles. A folding sifter bottom can also be provided.

---

The instant invention is generally concerned with wheelbarrows, and more particularly relates to a folding wheelbarrow collapsible in a unique manner so as to substantially reduce the effective size thereof for shipping, and more particularly storage purposes.

One of the primary objects of the instant invention is to provide a folding wheelbarrow which is so constructed as to, in its erected unfolded operational position, assume a configuration which is substantially that of a conventional wheelbarrow, including outwardly sloping upstanding walls and a flat bottom, while at the same time being quickly and easily compacted to an over-all width no greater than that of the axle of the single front wheel.

In conjunction with the above object, it is also highly significant that the folding wheelbarrow of the instant invention is, in its unfolded position, of a highly stable nature capable of easily accommodating full loads therein even under rough handling conditions.

Further, it is considered significant that the folding wheelbarrow of the instant invention be so constructed as to enable it to be quickly folded and unfolded as required, utilizing no mechanical fasteners such as bolts or screws.

In addition, an object of the instant invention resides in the incorporation of a double bottom, comprising a material-retaining solid panel and a separate material-sifting perforated panel or screen.

The advantages of the instant invention are achieved through the provision of a wheelbarrow wherein the two bottom panels, the front panel and the rear panel are all hingedly affixed to one side panel for selective folding or stacking thereagainst. The second side panel is in turn foldable against the stacked front, rear and bottom panels. both side panels are affixed to handle extensions which extend forwardly of the front panel and are swivelly secured to the wheel axle. The rear portions of these extensions mount depending legs which, through a pair of rigid links, are hingedly interconnected. Thus, through the swivel engagement of the handle extensions with the wheel axle and the hinged interconnecting of the legs, a swinging together of the sides of the barrow, after a collapsing or folding of the front, rear and bottom panels, can be easily effected, resulting in the collapsing of the entire barrow for storage purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the wheelbarrow comprising the instant invention;

FIG. 2 is a top plan view of the wheelbarrow comprising the instant invention;

FIG. 3 is a rear elevational view of the wheelbarrow;

FIG. 4 is an enlarged cross-sectional view taken substantially on a plane passing along line 4—4 in FIG. 1;

FIG. 5 is a cross-sectional detail taken substantially on a plane passing along line 5—5 in FIG. 1;

FIG. 6 is a cross-sectional detail taken substantially on a plane passing along line 6—6 in FIG. 1;

FIG. 7 is an enlarged cross-sectional detail taken substantially on a plane passing along line 7—7 in FIG. 1;

FIG. 8 is an exploded detail view illustrating the hinge components on the two bottom panels and the associated side against which they fold;

FIG. 9 is a view of the collapsed wheelbarrow with the handles removed therefrom;

FIG. 10 is an enlarged cross-sectional view through the collapsed wheelbarrow taken substantially on a plane passing along line 10—10 in FIG. 9;

FIG. 11 is a cross-sectional detail taken substantially on a plane passing along line 11—11 in FIG. 2; and FIG. 12 is a cross-sectional detail taken substantially on a plane passing along line 12—12 in FIG. 2.

Referring now more specifically to the drawings, reference numeral 20 is used to generally designate the folding wheelbarrow comprising the instant invention. The wheelbarrow 20 includes four upstanding panels, a left side panel 22, a right side panel 24, a front panel 26 and a rear panel 28. In addition, a pair of flat bottom panels 30 and 32 are also provided, the bottom panel 30 being imperforate and positionable in overlying relation to the perforated or screen-type panel 32.

The two bottom panels 30 and 32, as well as the front and rear panels 26 and 28 are hingedly secured to the corresponding edges of the left side panel 22. This mounting is effected by means of hinge knuckles defined on the corresponding edges for the reception of appropriate hinge pins therethrough. FIG. 8 is of interest in illustrating, in side elevation, the hinge knuckles associated with the left side 22 and the two bottom panels 30 and 32. These three sets of knuckles are received, in a predetermined internesting sequence, on a single elongated hinge pin. resulting in a pivotal mounting of the panels 30 and 32 on the side panel 22 for movement between a horizontal load receiving position and a substantially vertical folded or collapsed position. In order to properly accommodate the sifter panel 32 below the inperforate bottom panel 30, it will be noted that the hinged edge thereof has a the knuckles defined on an upstanding flange 34 of a reinforcing strip 36 secured therealong. The opposite edge of this sifter panel 32 is in turn rigidified by a flat strip 38 which, in the open position of the wheelbarrow 20, rests on an inwardly directed flange 40 defined along the lower edge of the right side panel 24.

Referring to FIGS. 4, 11 and 12 in particular, attention is directed to the fact that the upper edges of the upstanding panels are rolled outwardly about rigid wires or rods 42 so as to provide for a rigidification of these edges and the upstanding panels. If so desired, these wires or thin rods 42 can be extended so as to define the hinge pins utilized in interconnecting the knuckles of the various hinge structures. This is suggested in FIGS. 11 and 12 with regard to the hinged mounting of the front and rear panels 26 and 28 wherein the rigidifying wires 42 associated with the front and rear panels 26 and 28 continue downwardly through the internested hinge knuckles.

With reference to FIGS. 5 and 6 in particular, attention is directed to the fact that the free upstanding edges 44 and 46 of the front and rear panels 26 and 28 are laterally directed for nesting reception within the reversely bent upstanding side edges 48 and 50 of the right side panel 24, thus in effect locking the adjoining edges together, sealing these edges against the leakage of material therethrough, and providing for a positive rigidification of the edges. If so desired, a similar interlock can be provided between the bottom edge of each of the front and rear panels 26 and 28 and the underlying bottom panel 30.

Bolted to each of the side panels 22 and 24 and extending along the outer face thereof is a pair of tubular rod-like members 52 which in effect form extensons of a pair of rearwardly and upwardly extending handles 54. These extensions or tubular members 52 converge downwardly and forwardly terminating in socket defining forward end portions 56 which are swivelly received over ball-like enlargements 58 fixed to a transversely extending wheel axle 60. The wheel axle 60 rotatably mounts the single wheel 62 by means of an elongated sleeve bushing 64 oriented centrally thereon between the balls 58. These balls or ball-like enlargements 58 will be fixed to the axle 60 in any appropriate manner, such as by the use of keys or setscrews for the accommodation of the socket defining forward ends of the members or handle extensions 52 as these extensions move during the folding and unfolding of the wheelbarrow 20 as shall be pointed out presently.

Affixed to the rear ends of the extensions 52 and extending downwardly therefrom are a pair of elongated support legs 66 which freely cross each other and, in the unfolded position of the wheelbarrow 20, terminate in vertically directed capped feet 68. These legs 66, at approximately the point at which they cross, are provided with a pair of rigid upstanding links 70, the outer ends of which are hingedly interconnected by appropriate pin means 72 so as to provide for a hinged interlocking of the legs 66 for both providing lateral stability thereto and facilitating the folding and unfolding of the barrow 20. In addition, a rigid stop or stop plate 74 is welded to one of the legs 66 and projects laterally therefrom into overlying relation with the second leg 66 in a position whereby upon unfolding of the wheelbarrow 20, the second leg 66 will abut or engage against the stop 74 and preclude a further opening movement of the legs 66 relative to each other. In this manner, a positive stabilization of the legs 66 in the unfolded position thereof is achieved, such contributing significantly to the rigidity of the wheelbarrow in its operative condition and effectively resisting any tendency for the rear portion of the wheelbarrow to spread or deform under loaded conditions.

With reference to FIG. 7 in particular, it will be appreciated that the forward socketed ends 56 of the side members or handle extensions 52 are likewise limited to a predetermined outwardly swung position. This is effected by an actual engagement of the socket ends 56 against the axle or shaft 60 just outward of the wheel bushing 64 so as to not interfere with the free rolling of the wheel 62 on the axle 60. If deemed necessary, appropriate positioning collars can also be provided on the axle 60 so as to maintain the central orientation of the wheel 62.

With reference to FIG. 9, it will be noted that each of the handles 54 is provided with a reduced diameter end portion 76 which is telescopically received within the end of the corresponding barrow mounted extension 52 wherein it is releasably locked by appropriate bolt means 78. The removable nature of the handles 54 is particularly useful in compacting the wheelbarrow 20 for packaging and shipping purposes. Incidentally, as will be appreciated from the drawings, the legs 66 are themselves actually bolted to the wheelbarrow sides 22 and 24 so as to increase the rigidity and stability of the construction.

In collapsing the wheelbarrow 20, the first step involves an upward swinging of the bottom panels 30 and 32 against the left side panel 22, followed by an inward swinging of the rear panel 28 and a subsequent inward swinging of the front panel 26 into overlying relation with the upwardly swung bottom panels 30 and 32. Finally, the handles 54 are swung upwardly and inwardly toward each other providing for a pivoting movement of the legs 66 about the hinge unit 72 engaged therebetween and a pivoting of the socket ends 56 about the ball mounts 58 so as to collapse the right side panel 24 in overlying relation to the previously collapsed bottom, front and rear panels. When collapsed in this manner, the legs 66 will swing past each other and be oriented in generally parallel relation to each other, noting FIG. 9, with the bottom or feet portions 68 thereof diverging outwardly so as to form, in conjunction with the front wheel 62, a three-point support for the collapsed or folded wheelbarrow. In this collapsed position, it is contemplated that the width of the entire collapsed unit be no greater than the length of the axle 60 so as to provide a highly compact self-supporting unit. When completely collapsed, a suitable securing strap or latch can be utilized so as to lock the barrow in its collapsed state for simplifying the storage thereof.

From the foregoing, it should be appreciated that a highly unique folding wheelbarrow has been defined, this wheelbarrow being quickly opened and closed through merely the swinging of the various panels involved toward and away from a single base panel, the left side panel 22. In its open position, the various hingedly mounted panels lock into position, without mechanical fasteners such as bolts, screws or the like, so as to rigidify and stabilize the operational wheelbarrow. At the same time, the wheelbarrow is simply and quickly collapsed through an inward swinging of the panels in a predetermined sequence which results in an extremely narrow collapsed unit, this collapsed unit still being capable of wheeled movement through the single supporting wheel of the wheelbarrow. Incidently, it will of course be appreciated that should one wish to use the sifter bottom 32, the imperforate bottom 30 can be swung to its collapsed position, thereby exposing the sifter bottom.

I claim:

1. A folding wheelbarrow comprising a bottom panel, opposed right and left side panels, a front panel, and a rear panel, said panels being interconnected for movement between an unfolded position forming a material container defined by a bottom surrounded by upstanding walls, and a folded position wherein all of said panels generally parallel each other with the bottom, front and rear panels being sandwiched between the side panels, support means affixed to said panels for adjustment therewith, said support means including wheel means and handle means, said bottom panel being a rigid one-piece unit having one longitudinal edge thereof hingedly secured to the bottom edge of one of said side panels, and means along the lower edge of the second side panel receiving and supporting the free longitudinal edge of said bottom panel in the unfolded position of said wheelbarrow, said front and rear panels each including an upstanding edge hingedly secured to a corresponding upstanding edge on an adjacent side panel for swinging movement relative thereto, each of said front and rear panels including a free upstanding edge having means thereon selectively engageable with the side panel opposed from the side panel to which the first upstanding edge is hingedly secured, said wheel means including a transverse axle, said handle means extending along the length of said side panels and longitudinally forward and rearward thereof, said handle means comprising a pair of elongated members, one located outward of each side panel, each of said handle members including socket means on the forward end thereof, said socket means pivotally mounting the forward end of each handle member on the wheel axle for rotational movement relative thereto so as to enable an inward swinging of the side panels toward each other upon a lateral inward movement of the handle members toward each other, and a pair of legs fixed to said handle members adjacent the rear panel, said legs being hingedly interconnected for movement between a crossed relation to each other in the unfolded position, and a substantially parallel upright relation to each other in the folded position.

2. The wheelbarrow of claim 1 including stop means on said legs limiting the unfolding movement thereof to a predetermined position and preventing further outward opening thereof beyond the predetermined unfolded position, said wheel axle precluding an outward swinging of the forward ends of the handle members beyond a predetermined point corresponding to the unfolded position of the wheelbarrow.

3. The wheelbarrow of claim 1 wherein the means on the free upstanding edge of the front and rear panels includes a laterally directed edge portion on each of the front and rear panels, the side panel opposed from the side panel to which the front and rear panels are secured including reversely bent edge portions to which the laterally directed free edge portions of the front and rear panels are selectively engaged.

4. A folding wheelbarrow comprising a bottom panel, opposed right and left side panels, a front panel, and a rear panel, said panels being interconnected for movement between an unfolded position forming a material container defined by a bottom surrounded by upstanding walls, and a folded position wherein all of said panels generally parallel each other with the bottom, front and rear panels being sandwiched between the side panels, support means affixed to said panels for adjustment therewith, said support means including wheel means and handle means, said bottom panel being a rigid one-piece unit having one longitudinal edge thereof hingedly secured to the bottom edge of one of said side panels, and means along the lower edge of the second side panel receiving and supporting the free longitudinal edge of said bottom panel in the unfolded position of said wheelbarrow, and a sifter panel located in underlying relation to said bottom panel and being similarly hinged to the lower edge of one of said side panels for movement between a folded position paralleling the side panel to which it is hingedly secured, and an unfolded position defining a material supporting surface.

5. A folding wheelbarrow comprising a bottom panel, opposed right and left side panels, a front panel, and a rear panel, said panels being interconnected for movement between an unfolded position forming a material container defined by a bottom surrounded by upstanding walls, and a folded position wherein all of said panels generally parallel each other with the bottom, front and rear panels being sandwiched between the side panels, support means affixed to said panels for adjustment therewith, said support means including wheel means and handle means, said wheel means including a transverse axle, said handle means extending along the length of said side panels and longitudinally forward and rearward thereof, said handle means comprising a pair of elongated members, one located outward of each side panel, each of said handle members including socket means on the forward end thereof, said socket means pivotally mounting the forward end of each handle member on the wheel axle for rotational movement relative thereto so as to enable an inward swinging of the side panels toward each other upon a lateral inward movement of the handle members toward each other, and a pair of legs fixed to said handle members adjacent the rear panel, said legs being hingedly interconnected for movement between a crossed relation to each other in the unfolded position, and a substantially parallel upright relation to each other in the folded position.

6. The wheelbarrow of claim 5 wherein said handle means, rearward of the opposed side panels, include removable handle sections.

7. The wheelbarrow of claim 5 wherein each of said legs includes an angularly directed foot at the lower end thereof, said feet, in the unfolded position, being vertically directed, said feet, in the folded position, being outwardly and downwardly angled relative to each other so as to define spaced supports.

8. A folding wheelbarrow comprising a bottom panel, opposed right and left side panels, a front panel, and a rear panel, said panels being interconnected for movement between an unfolded position forming a material container defined by a bottom surrounded by upstanding walls, and a folded position wherein all of said panels generally parallel each other with the bottom, front and rear panels being sandwiched between the side panels, support means affixed to said panels for adjustment therewith, said support means including wheel means and handle means, said handle means extending along the length of said side panels and longitudinally forward and rearward thereof, said handle means comprising a pair of elongated members, one located adjacent each side panel, pivot means engaging the forward end portion of each handle member with the wheel means for pivotal movement of each handle member relative to the wheel means so as to enable an inward swinging of the side panels toward each other upon a lateral inward movement of the handle members toward each other, and a pair of legs fixed to said handle members adjacent the rear panel, said legs being hingedly interconnected for movement between a crossed relation to each other in the unfolded position, and a substantially parallel upright relation to each other in the folded position.

9. The wheelbarrow of claim 8 including stop means on said legs limiting the unfolding movement thereof to a predetermined position and preventing further outward opening thereof beyond the predetermined unfolded position.

References Cited
UNITED STATES PATENTS

| | | | |
|---|---|---|---|
| 705,406 | 7/1902 | House et al. | 280—47.3UX |
| 1,242,418 | 10/1917 | Booth | 280—47.31X |
| 2,422,331 | 6/1947 | Bates | 280—47.31X |
| 2,471,462 | 5/1949 | Toth | 280—47.31X |

BENJAMIN HERSH, Primary Examiner

J. A. PEKAR, Assistant Examiner

U.S. Cl. X.R.

280—47.31